US012735602B2

(12) United States Patent
Ono et al.

(10) Patent No.: US 12,735,602 B2
(45) Date of Patent: Sep. 15, 2026

(54) DECORATIVE SHEET

(71) Applicant: C.I.TAKIRON CORPORATION, Osaka (JP)

(72) Inventors: Hitomi Ono, Osaka (JP); Anna Yonezawa, Osaka (JP)

(73) Assignee: C.I.TAKIRON CORPORATION, Osaka (JP)

( * ) Notice: Subject to any disclaimer, the term of this patent is extended or adjusted under 35 U.S.C. 154(b) by 205 days.

(21) Appl. No.: 18/846,180

(22) PCT Filed: Oct. 7, 2022

(86) PCT No.: PCT/JP2022/037599
§ 371 (c)(1),
(2) Date: Sep. 11, 2024

(87) PCT Pub. No.: WO2023/176024
PCT Pub. Date: Sep. 21, 2023

(65) Prior Publication Data

US 2025/0179325 A1 Jun. 5, 2025

(30) Foreign Application Priority Data

Mar. 17, 2022 (JP) ................................ 2022-042836

(51) Int. Cl.
*B32B 3/10* (2006.01)
*C09D 4/06* (2006.01)
*C09D 135/02* (2006.01)

(52) U.S. Cl.
CPC ............ *C09D 135/02* (2013.01); *C09D 4/06* (2013.01)

(58) Field of Classification Search
None
See application file for complete search history.

(56) References Cited

U.S. PATENT DOCUMENTS

2025/0179325 A1* 6/2025 Ono ........................ C09D 4/06

FOREIGN PATENT DOCUMENTS

| | | | | |
|---|---|---|---|---|
| JP | H10157320 A | * | 6/1998 |
| JP | 2015-077691 A | | 4/2015 |
| JP | 5849790 B2 | * | 2/2016 |
| JP | 2018-164901 A | | 10/2018 |
| JP | 2024141850 A | * | 10/2024 |

* cited by examiner

*Primary Examiner* — Christopher M Polley
(74) *Attorney, Agent, or Firm* — Buchalter LLP

(57) ABSTRACT

A decorative sheet includes a base and a surface layer provided on the base. The surface layer includes an ultraviolet-cured layer provided on a surface of the base and an excimer light-cured layer provided on a surface of the ultraviolet-cured layer. The surface layer contains urethane acrylate and a vinyl chloride-vinyl acetate copolymer, and the mass ratio between the urethane acrylate and the vinyl chloride-vinyl acetate copolymer in the surface layer is the urethane acrylate:the vinyl chloride-vinyl acetate copolymer=100:2 to 100:60.

3 Claims, 2 Drawing Sheets

DECORATIVE SHEET

CROSS REFERENCE TO RELATED APPLICATIONS

This application is a national stage application, filed under 35 U.S.C. § 371, of International Application No. PCT/JP2022/037599, filed Oct. 7, 2022, which international application claims further priority to and the benefit of Japanese Application No. 2022-042836, filed Mar. 17, 2022; the contents of both of which as are hereby incorporated by reference in their entireties.

BACKGROUND

Technical Field

The present disclosure relates to a decorative sheet.

Description of Related Art

Decorative sheets are used for surface decorations to enhance design properties in various applications such as surface decorations of building materials, such as wall materials, construction materials, and fittings, surface decorations of furniture, automobile interiors, and low-voltage mountings. For example, as such decorative sheets, decorative sheets in which a layer having low glossiness (matte) effect is provided on a base are known.

For example, proposed is a decorative sheet including: a decorative layer containing a colorant on a base; and a clear layer containing silica particles obtained by wet-gel method and having a mean particle diameter of 5 μm or less as measured by a Coulter counter method (AP 50 μm) on the decorative layer. It is stated that with such a configuration, even if the decorative sheet includes a clear layer containing inorganic particles, a decorative sheet having a tone of the coloring layer suitably maintained and a favorable matte surface can be provided (for example, see Japanese Unexamined Patent Publication No. 2015-77691).

Further proposed is a decorative sheet in which the surface of a coating film structure provided on a base is irradiated with excimer light emitted from an excimer lamp, whereby the gloss of a portion of the surface of the coating film structure irradiated with electromagnetic waves is reduced as compared with that before the irradiation with electromagnetic waves. With such a configuration, a decorative sheet having regions with different matte appearance (e.g., see Japanese Unexamined Patent Publication No. 2018-164901) can be provided.

BRIEF SUMMARY

In the decorative sheet described in Patent Document 1, silica particles are merely mixed in the clear layer. Thus, a sufficient matte effect cannot be obtained, and low glossiness is hardly exhibited.

In the decorative sheet of Patent Document 2, silica particles and the like are not mixed in the clear layer, and excimer light irradiation is merely performed. Thus, a sufficient matte effect cannot be obtained, and non-uniform asperities are formed in the clear layer, whereby appearance (design properties) is degraded.

The present disclosure was made in view of the above problems, and an object of the present disclosure is to provide a decorative sheet having low glossiness caused by the matte effect and excellent appearance.

In order to achieve the above object, the decorative sheet of the present disclosure includes: a base; and a surface layer provided on the base. The surface layer includes an ultraviolet-cured layer provided on a surface of the base and an excimer light-cured layer provided on a surface of the ultraviolet-cured layer. The surface layer contains urethane acrylate and a vinyl chloride-vinyl acetate copolymer. A mass ratio between the urethane acrylate and the vinyl chloride-vinyl acetate copolymer in the surface layer is the urethane acrylate:the vinyl chloride-vinyl acetate copolymer=100:2 to 100:60.

The present disclosure can provide a decorative sheet having low glossiness, uniform asperities in the entire surface of the surface layer, and excellent appearance.

DETAILED DESCRIPTION OF VARIOUS EMBODIMENTS

The decorative sheet according to the present disclosure will be described in detail below. It should be noted that the present disclosure is not limited to the following embodiments and can be appropriately modified and applied without departing from the scope of the present disclosure.

<Decorative Sheet>

Figure 1:
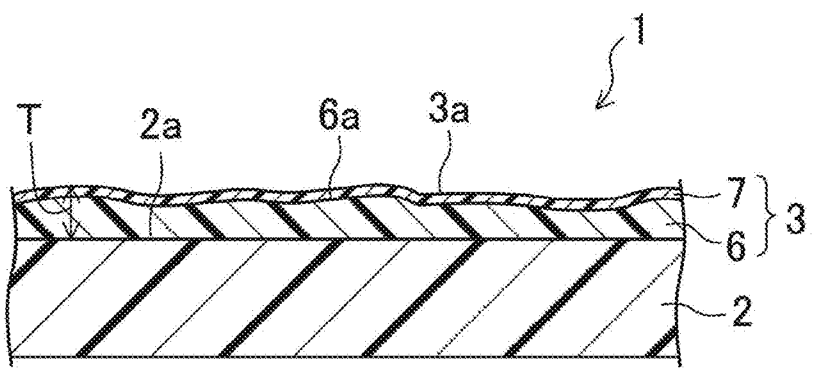
FIG. 1 is a sectional view of a decorative sheet according to an embodiment of the present disclosure.

As illustrated in FIG. 1, a decorative sheet 1 of the present disclosure includes a base 2 and a surface layer 3 provided on a surface 2*a* of the base 2.

<Base>

The base 2 is, for example, a thermoplastic resin sheet, and the thermoplastic resin sheet used can be one generally used as a base in the decorative sheet 1. Specific examples thereof include, for example, a polyvinyl chloride sheet, a glycol-modified polyethylene terephthalate (PETG) sheet, a crystalline polyester resin (APET) sheet in an amorphous state, a polyolefin sheet (such as a polyethylene sheet and a polypropylene sheet), an acrylonitrile-butadiene-styrene resin (ABS) sheet, and a polycarbonate sheet. Examples of the crystalline polyester resin (APET) sheet in the amorphous state used in the base 2 include a recycled polyethylene terephthalate (RPET) sheet made of, for example, a PET bottle as a raw material.

The thermoplastic resin sheet is preferably a glycol-modified polyethylene terephthalate sheet from the viewpoint of ease of processing of quadric surface and excellent three-dimensional moldability. The glycol-modified polyethylene terephthalate sheet is a kind of polyethylene terephthalate, and is amorphous polyester containing, as glycol components, diol (1,4-cyclohexanedimethanol) other than ethylene glycol in addition to ethylene glycol, whereas polyethylene terephthalate contains, as a glycol component, ethylene glycol.

The thermoplastic resin sheet may be a stretched sheet or an unstretched sheet. The thermoplastic resin sheet may further contain, if necessary, additives such as a colorant, an ultraviolet absorber, a light stabilizer, an antioxidant, an antistat, a storage stabilizer, a lubricant, and a filler. The thermoplastic resin sheet is preferably colored in view of design properties.

The thickness of the base 2 is not particularly limited, and is preferably 50 μm to 800 μm, more preferably 250 μm to 500 μm. When the thickness of the base 2 is 50 μm or more, the mechanical strength and the concealability can be sufficiently improved. When the thickness of the base 2 is 800 μm or less, the three-dimensional moldability is more excellent, and the flexibility and the printability are easily secured.

<Surface Layer>

The surface layer 3 is a coating film of a paint containing, as main components, urethane acrylate and monofunctional acrylate and further containing a vinyl chloride-vinyl acetate copolymer.

The surface layer 3 can be formed by applying a paint containing a vinyl chloride-vinyl acetate copolymer to a surface 2*a* of a base 2 and then curing the paint. The surface layer 3 includes an ultraviolet-cured layer 6 provided on the surface 2*a* of the base 2 and an excimer light-cured layer 7 provided on a surface 6*a* of the ultraviolet-cured layer 6.

As illustrated in FIG. 1, the surface (i.e., the surface opposite to the base 2 side) 3*a* of the surface layer 3 has wrinkles.

The urethane acrylate forming the surface layer 3 can be of 2- to 10-functional, and examples thereof include, for example, a phenyl glycidyl ether acrylate hexamethylene diisocyanate urethane polymer, a pentaerythritol triacrylate hexamethylene diisocyanate urethane prepolymer, and a dipentaerythritol pentaacrylate hexamethylene diisocyanate urethane prepolymer. Further, urethane acrylate used can be a commercially available product such as EBECRYL 8402, KRM 8452, EBECRYL 210, EBECRYL 220, EBECRYL 4500, EBECRYL 230, EBECRLY 270, EBECRYL 4858, EBECRYL 8804, EBECRYL 8807, EBECRYL 9270, EBECRYL 4100, EBECRYL 4513, EBECRYL 8311, EBECRYL 8465, EBECRYL 9260, EBECRYL 8701, KRM 8667, EBECRYL 4265, EBECRYL 4587, EBECRYL 4200, EBECRYL 8210, EBECRYL 1290, EBECRYL 5129, EBECRYL 8254, EBECRYL 8301R, KRM 8200, KRM 8904, RUA-062NS (2-functional acrylate monomer-containing product), U-6LPA, UA-1100H, U-200PA, UA-160TM, and UV-7600B (all of which are trade names). These urethane acrylates may be used alone or in combination of two or more of them.

Examples of the monofunctional acrylate forming the surface layer 3 include, for example, ethyl carbitol acrylate, methoxy ethylene glycol (meth)acrylate, methoxy polyethylene glycol (meth)acrylate, β-(meth)acryloyloxy ethyl hydrogen phthalate, β-(meth)acryloyloxy ethyl hydrogen succinate, nonyl phenoxyethyl (meth)acrylate, 3-chloro-2-hydroxypropyl (meth)acrylate, phenoxyethyl (meth)acrylate, phenoxy polyethylene glycol (meth)acrylate, butoxy polyethylene glycol (meth)acrylate, alkyl (meth)acrylate, cyclohexyl (meth)acrylate, tetrahydrofurfuryl (meth)acrylate, isobornyl (meth)acrylate, benzyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethyl phthalic acid, 3-acryloyloxy glycerin mono(meth)acrylate, 2-hydroxybutyl (meth)acrylate, 2-hydroxy-1-(meth)acryloxy-3-(meth)acryloyloxy propane, polypropylene glycol mono(meth)acrylate, polyethylene glycol mono(meth)acrylate, poly ε-caprolactone mono (meth)acrylate, dialkylaminoethyl (meth)acrylate, glycidyl (meth)acrylate, mono[2-(meth)acryloyloxyethyl]acid phosphate, trifluoroethyl (meth)acrylate, 2,2,3,3-tetrafluoropropyl (meth)acrylate, 2,2,3,4,4,4-hexafluorobutyl (meth)acrylate, perfluorooctylethyl (meth)acrylate, dicyclopentenyloxyalkyl (meth)acrylate, dicyclopentenyl (meth)acrylate, tricyclodecanyl (meth)acrylate, tricyclodecanyl oxyethyl (meth)acrylate, and isobornyl oxyethyl (meth)acrylate. These monofunctional acrylates may be used alone or in combination of two or more of them.

The mixing ratio between the urethane acrylate and the monofunctional acrylate in the surface layer 3 is not particularly limited as long as the characteristics of the decorative sheet 1 of the present disclosure are not impaired, but is preferably in the range of 10:90 to 90:10 (urethane acrylate:monofunctional acrylate) in terms of mass ratio. This is because the urethane acrylate has low fluidity, and thus, when the mass ratio of the urethane acrylate increases, the surface 3*a* of the surface layer 3 is less likely to be wrinkled, and low glossiness caused by the matte effect is less likely to be exhibited. This is also because the monofunctional acrylate has low reactivity, and thus, when the mass ratio of the monofunctional acrylate increases, the paint is less likely to be cured.

The thickness T of the surface layer 3 is not particularly limited, and is preferably 1 μm to 45 μm, more preferably 1 μm to 10 μm. This is because when the thickness of the surface layer 3 is less than 1 μm, a coating film region where the vinyl chloride-vinyl acetate copolymer to be described later is movable decreases during the excimer irradiation, whereby the surface layer 3 may be less likely to be wrinkled, and low glossiness caused by the matte effect may be less likely to be exhibited. This is also because when the thickness of the surface layer 3 is larger than 45 μm, tactility further decreases, and the hardness increases, whereby molding processability may decrease. Further, when the thickness of the surface layer 3 is larger than 10 μm, the surface roughness Sa of the surface layer 3 increases, whereby fingerprint resistance is improved, but tactility may decrease.

The decorative sheet 1 of the present disclosure is characterized in that the mass ratio between the urethane acrylate and the vinyl chloride-vinyl acetate copolymer in the surface layer is the urethane acrylate:the vinyl chloride-vinyl acetate copolymer=100:2 to 100:60.

With such a configuration, the asperities are formed of vinyl chloride-vinyl acetate copolymer having no reactive group in the surface layer 3. Thus, uniform asperities can be formed in the entire surface 3*a* of the surface layer 3.

The mass ratio between the urethane acrylate and the vinyl chloride-vinyl acetate copolymer in the surface layer 3 is preferably the urethane acrylate:the vinyl chloride-vinyl acetate copolymer=100:4 to 100:60.

When the content of the vinyl chloride-vinyl acetate copolymer relative to 100 parts by mass of the urethane acrylate is less than 2 parts by mass in the surface layer 3, the wrinkling caused by the vinyl chloride-vinyl acetate copolymer, which will be described later, is not sufficiently promoted because of the small amount of the vinyl chloride-vinyl acetate copolymer. It may thus become difficult to form uniform asperities in the entire surface 3*a* of the surface layer 3. When the content of the vinyl chloride-vinyl acetate copolymer relative to 100 parts by mass of the urethane acrylate is more than 60 parts by mass in the surface layer 3, the wrinkling caused by the vinyl chloride-vinyl acetate copolymer, which will be described later, is not sufficiently promoted because the vinyl chloride-vinyl acetate copolymer excessively absorbs the monomer component and the fluidity is lost. It may thus become difficult to form uniform asperities in the entire surface 3*a* of the surface layer 3.

The paint for forming the surface layer 3 may further contain other components than the urethane acrylate, the monofunctional acrylate, and the vinyl chloride-vinyl acetate copolymer, within a range that does not ruin the effect of the present disclosure. Examples of the other components include, for example, a photoinitiator, a weathering agent, a colorant, an ultraviolet absorber, a light stabilizer, an antioxidant, an antistat, a storage stabilizer, a plasticizer, a lubricant, and a filler.

Examples of the photoinitiator used include, for example, an alkyl phenone-based initiator, an acylphosphine oxide-based initiator, and a cationic initiator. Examples of the weathering agent used include an ultraviolet absorber and a light stabilizer.

<Production Method>

When the decorative sheet 1 of the present disclosure is produced, a base 2 made of the above described thermoplastic resin sheet is first provided, for example. The thermoplastic resin sheet used may be commercially available or may be produced by any known method such as calendering and extrusion molding.

Next, a paint obtained by adding urethane acrylate, monofunctional acrylate, a photoinitiator, and a vinyl chloride-vinyl acetate copolymer to a solvent is applied to the surface 2*a* of the base 2, to form a coating film which serves as a surface layer 3 on the surface 2*a* of the base 2.

For example, when urethane acrylate containing 2-functional acrylate monomer such as the above mentioned RUA-062NS is used, the use of the monofunctional acrylate can be omitted.

The method for applying the paint is not particularly limited, and examples thereof include, for example, cast coating, die coating, gravure coating, roll knife coating, reverse roll coating, roll coating, and comma coating.

Then, the coating film provided on the surface 2*a* of the base 2 is irradiated with excimer light. More specifically, the coating film is irradiated with excimer light having a short peak wavelength (in the range from 120 nm to 230 nm). Thus, only the outermost surface of the coating film which serves as the surface layer 3 is cured, thereby forming the above mentioned excimer light-cured layer 7.

In this process, non-uniformity occurs between the surface and the inside of the coating film, and components of the coating film moves from an unreacted portion inside the coating film to the surface, whereby the surface of the coating film is wrinkled. It thus becomes possible to achieve low gloss level (low glossiness) of the surface layer 3. Further, the vinyl chloride-vinyl acetate copolymer inside the coating film does not have a reactive group and is thus easily moved to the surface (i.e., the excimer light-cured layer 7) of the coating film. Thus, the vinyl chloride-vinyl acetate copolymer promotes the wrinkling and causes asperities to be formed in the surface of the coating film. As a result, uniform asperities can be formed in the entire surface 3*a* of the surface layer 3.

When excimer light irradiation is performed using an excimer lamp, a peak wavelength of the electromagnetic wave can be changed by changing discharge gas with which the excimer lamp is filled. Examples of the discharge gas used for the excimer light irradiation at the peak wavelength include, for example, $Ar^2$, $Kr^2$, and $Xe^2$.

Then, the coating film is irradiated with ultraviolet light (350 nm to 450 nm) so as to be cured, thereby forming an ultraviolet-cured layer 6. Accordingly, the surface layer 3 including the ultraviolet-cured layer 6 provided on the surface 2*a* of the base 2 and the excimer light-cured layer 7 provided on the surface 6*a* of the ultraviolet-cured layer 6 is formed, and uniform asperities are formed in the entire surface 3*a* of the surface layer 3. As a result, the decorative sheet 1 having improved appearance due to the uniform asperities while maintaining low glossiness by the excimer irradiation is produced.

Even if the coating film is again irradiated with excimer light having a short peak wavelength (in the range from 120 nm to 230 nm) instead of the ultraviolet light (350 nm to 450 nm), the coating film is not completely cured.

Further, in the decorative sheet 1 of the present disclosure, the vinyl chloride-vinyl acetate copolymer forms uniform asperities in the entire surface 3*a* of the surface layer 3, as described above. Thus, the standard deviation a of the surface roughness Sa [μm] of the surface 3*a* of the surface layer 3 becomes 0.2 μm or less. It makes it possible to provide a decorative sheet 1 having excellent appearance.

The term "surface roughness Sa" herein refers to a "three-dimensional surface property parameter (three-dimensional arithmetic mean roughness)" defined in ISO 25178.

The term "standard deviation a of surface roughness Sa" herein refers to the range of the surface roughness Sa (variation of the surface roughness Sa), and can be determined by the method described later.

In the decorative sheet 1 of the present disclosure, the gloss level G of the surface 3*a* of the surface layer 3 becomes 5 or less due to the matte effect caused by the wrinkles described above. This makes it possible to achieve low glossiness.

The "gloss level" herein is a gloss level at 60° measured by the method in accordance with JIS Z 8741:1997.

In view of further improving low glossiness to enhance design properties, the gloss level G is preferably 4 or less, more preferably 3 or less.

As described above, in the decorative sheet 1 of the present disclosure, the surface layer 3 contains urethane acrylate and a vinyl chloride-vinyl acetate copolymer, and the mass ratio between the urethane acrylate and the vinyl chloride-vinyl acetate copolymer in the surface layer 3 is the urethane acrylate:the vinyl chloride-vinyl acetate copolymer=100:2 to 100:60. This makes it possible to provide a decorative sheet 1 having uniform asperities in the entire surface 3*a* of the surface layer 3, and excellent appearance.

This makes it possible to provide a decorative sheet 1 having low glossiness due to the matte effect caused by the wrinkles.

EXAMPLES

The present disclosure will be described below based on the Examples of the present disclosure. Note that the present disclosure shall not be limited to these examples. These examples may be modified and changed based on the intent of the present disclosure. Such a change and modification shall not be excluded from the scope of the present disclosure.

Materials used for production of a decorative sheet are shown below:

(1) Urethane acrylate: 9-functional urethane acrylate (manufactured by Mitsubishi Chemical Corporation, trade name: UV-7620EA);

(2) Monofunctional acrylate: tetrahydrofurfuryl acrylate (manufactured by Kyoeisha Chemical Co., Ltd., trade name: Light Acrylate THF-A);

(3) Vinyl chloride-vinyl acetate copolymer 1 (manufactured by KANEKA CORPORATION, trade name: HM515);

(4) Vinyl chloride-vinyl acetate copolymer 2 (manufactured by KANEKA CORPORATION, trade name: T5HX);

(5) Vinyl chloride-vinyl acetate copolymer 3 (manufactured by NISSIN CHEMICAL CO., LTD., trade name: SOLBIN AL);

(6) Vinyl chloride-vinyl acetate copolymer 4 (manufactured by NISSIN CHEMICAL CO., LTD., trade name: SOLBIN CL);

(7) Initiator 1: alkylphenone photopolymerization initiator (manufactured by IGM Resins B. V., trade name: Omnirad 1173);

(8) Reactive resin 1: lauryl acrylate (manufactured by Kyoeisha Chemical Co., Ltd., trade name: Light Acrylate L-A);

(9) Reactive resin 2: stearyl acrylate (manufactured by Kyoeisha Chemical Co., Ltd., trade name: Light Acrylate S-A); and

(10) Reactive resins 3: trimethylol propane ethoxytriacrylate (manufactured by DAICEL-ALLNEX LTD., trade name: EBECRYL 160S).

Example 1

<Production of Decorative Sheet>

First, a polyvinyl chloride sheet having a thickness of 350 μm was provided as a base. Materials shown in Table 1 were mixed to prepare a paint of Example 1 having composition (parts by mass) shown in Table 1. The paint was then applied to the surface of the base by using a bar coater, and then dried at 60° C. for 1 minute to form, on the surface of the base, a coating film which served as a surface layer. A solvent of the paint used was methyl ethyl ketone.

Next, the coating film was irradiated with excimer light (peak wavelength: 172 nm) using, as discharge gas, $Xe^2$ under a nitrogen atmosphere by using excimer irradiation equipment (manufactured by USHIO INC., trade name: 172 nm Light Emission Unit, Model: SUS-1000). The irradiation was performed so that the cumulative amount of light became 25 $mJ/cm^2$ and the irradiation light intensity became 16 $mW/cm^2$.

Subsequently, the coating film was irradiated with ultraviolet light (dominant wavelength: 365 nm) by using ultraviolet light irradiation equipment (manufactured by EYE GRAPHICS COMPANY, a UV curing high-pressure mercury lamp 4 kW (H04-L41)) to be photo-cured, thereby forming a surface layer on the surface of the base. Thus, a decorative sheet was produced. The ultraviolet light irradiation was performed under the conditions where the ultraviolet light irradiation distance was 15 cm and the lamp moving rate was 0.75 m/min, and the amount of irradiation was 200 $mJ/cm^2$.

<Measurement of Thickness>

Next, the thickness T of the surface layer of the decorative sheet produced was measured using a digital microscope (manufactured by KEYENCE CORPORATION, trade name: VHX-5000) or a field emission scanning electron microscope (SEM) (manufactured by Hitachi High-Technologies Corporation, trade name: S-4800).

More specifically, the sheet was cut to expose its cross section, and the cross section was observed with the digital microscope (measurement magnification: 500×) or the field emission scanning electron microscope (measurement magnification: 1000×) to select ten portions having high coating film heights and low coating film heights. The thicknesses of the portions were then measured, and the average value was calculated. The measurement was performed a total of three times, and the average of the three values of the coating film height was calculated and used as the thickness T of the surface layer. Table 1 shows the results.

<Measurement of Gloss Level>

Next, the gloss level G at 60° in the surface layer of the decorative sheet produced was measured by using a glossmeter (manufactured by HORIBA, Ltd., trade name: Gloss Checker IG-320) in accordance with JIS Z 8741:1997. The measurement was performed a total of five times, and the average of the five values of the gloss level was calculated and used as the gloss level G of the surface layer.

The standard deviation $\sigma_G$ was calculated using the five values of the gloss level measured. More specifically, the standard deviation $\sigma_G$ was determined by the following equation (1) using the five values of the gloss level measured as $G_1$, $G_2$, $G_3$, $G_4$, and $G_5$. Table 1 shows the results.

[Mathematical 1]

$$\sigma_G = \sqrt{\frac{\sum_{i=1}^{5}(G_i - G)^2}{4}} \tag{1}$$

<Measurement of Surface Roughness>

Next, the surface roughness of the surface layer of the decorative sheet produced (the surface roughness on the surface of the surface layer opposite to the base) Sa was measured by using a 3D laser scanning confocal microscope (manufactured by KEYENCE CORPORATION, trade name: VK-X1000) in accordance with ISO 25178. The measurement was performed in the range of 277 μm×208 μm by using 404 nm semiconductor laser as a laser species and 50× standard objective lens. The measurement was performed a total of ten times, and the average of the ten values of the surface roughness Sa was calculated and used as the surface roughness Sa of the surface layer.

The standard deviation $\sigma_G$ was calculated using the ten values of the surface roughness Sa measured. More specifically, the standard deviation $\sigma_G$ was determined by the following equation (2) using ten values of the surface roughness measured as $Sa_1$, $Sa_2$, $Sa_3$, $Sa_4$, $Sa_5$, $Sa_6$, $Sa_7$, $Sa_8$, $Sa_9$, and $Sa_{10}$. Table 1 shows the results.

[Mathematical 2]

$$\sigma = \sqrt{\frac{\sum_{i=1}^{10}(Sa_i - Sa)^2}{9}} \tag{2}$$

Figure 2:
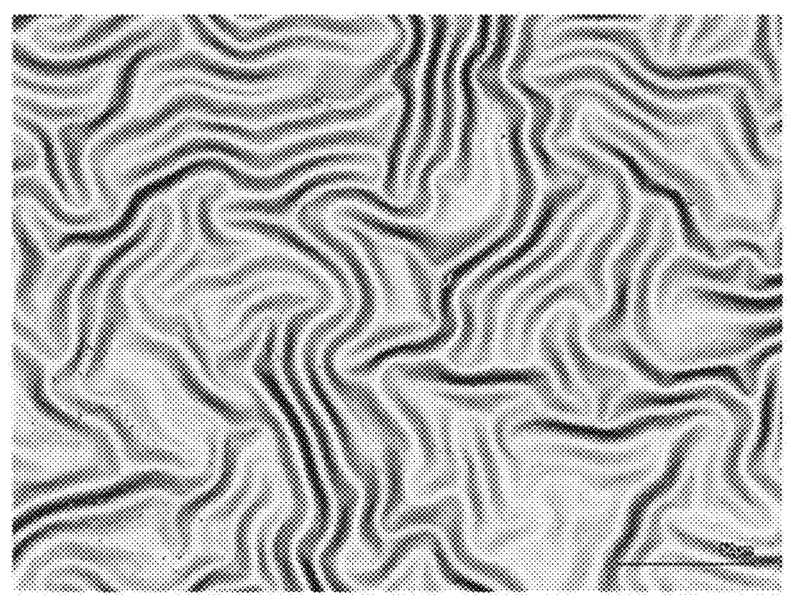
FIG. 2 is a laser micrograph showing a state of a surface of a surface layer in a decorative sheet of Example 1.

FIG. 2 shows a laser micrograph showing the state of the surface of the surface layer in the decorative sheet of this Example. As can be seen from FIG. 2, the decorative sheet of this Example has low glossiness, uniform asperities in the entire surface of the surface layer, and excellent appearance.

Examples 2 to 11 and Comparative Examples 1 to 4

Decorative sheets were produced in the same manner as in Example 1 except that the composition of components of the paint was changed to those (parts by mass) shown in Tables 1 and 2.

Then, the thickness, the gloss level, and the surface roughness were measured in the same manner as in Example 1. Tables 1 and 2 show the results.

Figure 3:
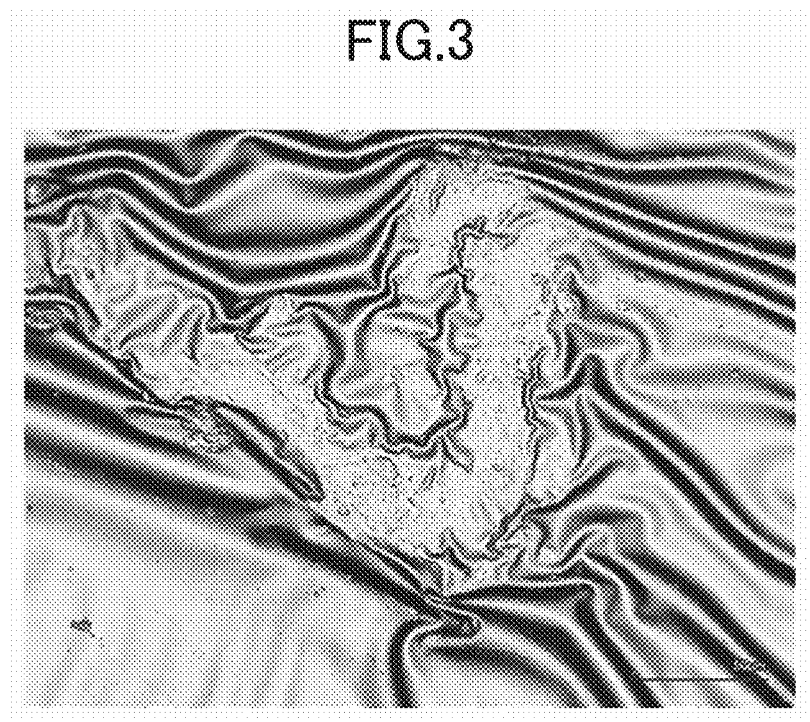
FIG. 3 is a laser micrograph showing a state of a surface of a surface layer in a decorative sheet of Comparative Example 1.

FIG. 3 shows a laser micrograph showing the state of the surface of the surface layer in the decorative sheet of Comparative Example 1. As illustrated in FIG. 3, the decorative sheet of Comparative Example 1 has non-uniform asperities and inferior appearance (design properties).

Comparative Examples 5 and 6

Decorative sheets of Comparative Examples 5 and 6 were tried to be produced in the same manner as in Example 1 except that the composition of components of the paint was changed to those (parts by mass) shown in Table 2. However, the content of the vinyl chloride-vinyl acetate copolymer relative to 100 parts by mass of the urethane acrylate in the surface layer was higher than 60 parts by mass in Comparative Examples 5 and 6, and thus, the vinyl chloride-vinyl acetate copolymer was not dissolved in the solvent (methyl ethyl ketone), and the paints were not formed.

Accordingly, the thickness, the gloss level, and the surface roughness could not be measured in Comparative Examples 5 and 6.

TABLE 1

| | | | The number of functional groups | Example 1 | Example 2 | Example 3 | Example 4 | Example 5 | Example 6 |
|---|---|---|---|---|---|---|---|---|---|
| Mixing ratio (parts by mass) | Urethane acrylate | | 9 | 100 | 100 | 100 | 100 | 100 | 100 |
| | Monofunctional acrylate | | 1 | 65 | 65 | 65 | 65 | 65 | 65 |
| | Initiator 1 | | | 4 | 4 | 4 | 4 | 4 | 4 |
| | Solvent (methyl ethyl ketone) | | | 106.25 | 103.75 | 106.25 | 113.75 | 106.25 | 103.75 |
| | Vinyl chloride-vinyl acetate copolymer 1 | | | 7.125 | — | — | — | — | — |
| | Vinyl chloride-vinyl acetate copolymer 2 | | | — | 4.125 | 7.125 | 15 | — | — |
| | Vinyl chloride-vinyl acetate copolymer 3 | | | — | — | — | — | 7.125 | — |
| | Vinyl chloride-vinyl acetate copolymer 4 | | | — | — | — | — | — | 4.125 |
| | Thickness T of surface layer [μm] | | | 5.5 | 5.5 | 5.5 | 5.5 | 5.5 | 5.5 |
| Evaluations | Glossiness G [—] | Average value (n = 5) | | 3.3 | 2.9 | 2.9 | 3.2 | 2.9 | 3.0 |
| | | Standard deviation (n = 5) | | 0.10 | 0 | 0.10 | 0.10 | 0 | 0 |
| | Surface roughness Sa [μm] | Average value (n = 10) | | 0.9 | 1.0 | 1.0 | 0.8 | 1.0 | 1.0 |
| | | Standard deviation σ [μm] (n = 10) | | 0.04 | 0.01 | 0.05 | 0.03 | 0.06 | 0.07 |

| | | | The number of functional groups | Example 7 | Example 8 | Example 9 | Example 10 | Example 11 |
|---|---|---|---|---|---|---|---|---|
| Mixing ratio (parts by mass) | Urethane acrylate | | 9 | 100 | 100 | 100 | 100 | 100 |
| | Monofunctional acrylate | | 1 | 65 | 65 | 65 | 65 | 65 |
| | Initiator 1 | | | 4 | 4 | 4 | 4 | 4 |
| | Solvent (methyl ethyl ketone) | | | 106.25 | 110 | 113.75 | 122.5 | 156.25 |
| | Vinyl chloride-vinyl acetate copolymer 1 | | | — | — | — | — | — |
| | Vinyl chloride-vinyl acetate copolymer 2 | | | — | — | — | — | — |
| | Vinyl chloride-vinyl acetate copolymer 3 | | | — | — | — | — | — |
| | Vinyl chloride-vinyl acetate copolymer 4 | | | 7.125 | 10.125 | 15 | 23.75 | 57.5 |
| | Thickness T of surface layer [μm] | | | 5.5 | 5.5 | 5.5 | 5.5 | 5.5 |
| Evaluations | Glossiness G [—] | Average value (n = 5) | | 2.4 | 2.9 | 3.4 | 3.4 | 3.5 |
| | | Standard deviation (n = 5) | | 0.10 | 0.10 | 0.20 | 0.10 | 1.10 |
| | Surface roughness Sa [μm] | Average value (n = 10) | | 1.0 | 1.0 | 0.7 | 0.6 | 0.6 |
| | | Standard deviation σ [μm] (n = 10) | | 0.07 | 0.07 | 0.04 | 0.04 | 0.03 |

TABLE 2

| | | The number of functional groups | Comparative Example 1 | Comparative Example 2 | Comparative Example 3 | Comparative Example 4 | Comparative Example 5 | Comparative Example 6 |
|---|---|---|---|---|---|---|---|---|
| Mixing ratio (parts by mass) | Urethane acrylate | 9 | 100 | 100 | 100 | 100 | 100 | 100 |
| | Monofunctional acrylate | 1 | 65 | 65 | 65 | 65 | 65 | 65 |
| | Initiator 1 | | 4 | 4 | 4 | 4 | 4 | 4 |
| | Solvent (methyl ethyl ketone) | | 106.25 | 113.75 | 106.25 | 101.25 | 232.5 | 412.5 |
| | Vinyl chloride-vinyl acetate copolymer 4 | | — | — | — | 1.375 | 133.75 | 312.5 |
| | Reactive resin 1 | | 7.125 | — | — | — | — | — |
| | Reactive resin 2 | | — | 7.125 | — | — | — | — |
| | Reactive resin 3 | | — | — | 7.125 | — | — | — |
| | Thickness T of surface layer [μm] | | 5.5 | 5.5 | 5.5 | 5.5 | Unmeasurable | Unmeasurable |

TABLE 2-continued

| | | The number of functional groups | Comparative Example 1 | Comparative Example 2 | Comparative Example 3 | Comparative Example 4 | Comparative Example 5 | Comparative Example 6 |
|---|---|---|---|---|---|---|---|---|
| Evaluations | Glossiness G [—] | Average value (n = 5) | 3.5 | 3.8 | 3.3 | 3.2 | | |
| | | Standard deviation (n = 5) | 0.30 | 0.20 | 0.30 | 0 | | |
| | Surface roughness Sa [μm] | Average value (n = 10) | 1.3 | 1.6 | 1.4 | 1.1 | | |
| | | Standard deviation σ [μm] (n = 10) | 0.23 | 0.75 | 0.36 | 0.25 | | |

As can be seen from Table 1, in each of the decorative sheets of Examples 1 to 11, the gloss level of the surface layer was 5 or less, so that the decorative sheet had low glossiness, and the standard deviation of the surface roughness Sa was 0.2 μm or less, so that uniform asperities were formed in the entire surface of the surface layer, and the decorative sheet had excellent appearance.

In contrast, as can be seen from Table 2, in each of the decorative sheets of Comparative Examples 1 to 3, the surface layer did not contain a vinyl chloride-vinyl acetate copolymer and contained a reactive resin (resin having a reactive group). Thus, the reactive resin did not move to the surface of the coating film, and the wrinkling was not promoted sufficiently. Accordingly, the standard deviation of the surface roughness Sa became larger than 0.2 μm, asperities were non-uniformly formed in the entire surface of the surface layer, and the decorative sheet had poor appearance.

Further, in Comparative Example 4, the content of the vinyl chloride-vinyl acetate copolymer relative to 100 parts by mass of the urethane acrylate in the surface layer was less than 2 parts by mass. Thus, the wrinkling caused by the vinyl chloride-vinyl acetate copolymer was not promoted sufficiently. Accordingly, the standard deviation of the surface roughness Sa became larger than 0.2 μm, asperities were non-uniformly formed in the entire surface of the surface layer, and the decorative sheet had poor appearance.

The above describes the embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:

1. A decorative sheet comprising:

a base; and a surface layer provided on the base, the surface layer including an ultraviolet-cured layer provided on a surface of the base and an excimer light-cured layer provided on a surface of the ultraviolet-cured layer, the surface layer containing a urethane acrylate and a vinyl chloride-vinyl acetate copolymer, a mass ratio between the urethane acrylate and the vinyl chloride-vinyl acetate copolymer in the surface layer being the urethane acrylate:the vinyl chloride-vinyl acetate copolymer=100:2 to 100:60.

2. The decorative sheet of claim 1, wherein the surface layer has a gloss level of 5 or less.

3. The decorative sheet of claim 1, wherein a standard deviation of surface roughness of a surface of the surface layer opposite to the base is 0.2 μm or less.

* * * * *